United States Patent
Tong et al.

(10) Patent No.: US 8,245,517 B2
(45) Date of Patent: Aug. 21, 2012

(54) GAS TURBINE STARTING WITH STEPPING SPEED CONTROL

(75) Inventors: Bing Tong, San Diego, CA (US); Timothy J. Sullivan, La Mesa, CA (US); Paul E. Hilgeman, Santee, CA (US); Tarrence L. Mack, Santee, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 658 days.

(21) Appl. No.: 12/468,390

(22) Filed: May 19, 2009

(65) Prior Publication Data

US 2010/0293961 A1    Nov. 25, 2010

(51) Int. Cl.
  *F02C 7/26* (2006.01)
(52) U.S. Cl. ............... 60/778; 60/786; 60/787; 60/788; 60/772
(58) Field of Classification Search .................. 60/772, 60/778, 786, 787, 788
See application file for complete search history.

(56) References Cited

U.S. PATENT DOCUMENTS

| | | | |
|---|---|---|---|
| 5,349,814 A | 9/1994 | Ciokajlo et al. | |
| 5,722,228 A | 3/1998 | Lampe et al. | |
| 5,844,383 A | 12/1998 | Denaci | |
| 6,810,677 B2 | 11/2004 | Dewis | |
| 2007/0068169 A1 * | 3/2007 | Riley | 60/778 |

* cited by examiner

*Primary Examiner* — William H Rodriguez
*Assistant Examiner* — Steven Sutherland
(74) *Attorney, Agent, or Firm* — Kinney & Lange, P.A.

(57) ABSTRACT

The system and method of the present invention provides stepping speed control of a gas turbine engine to reliably light-off a gas turbine engine. During starting, the speed of the gas turbine engine is incremented by stepped amounts through the light-off window from a minimum speed value to a maximum speed value, with the speed of the gas turbine dwelling at each stepped value for a period of time before incrementing the speed of the engine to the next stepped level. If the gas turbine engine is stepped through the entire light-off window without success, the controller decreases the speed of the gas turbine engine to the minimum value and begins the process again. The process continues until successful light-off is initiated or until the light-off window is traversed a certain number of times, after which the start process is aborted.

21 Claims, 2 Drawing Sheets

GAS TURBINE STARTING WITH STEPPING SPEED CONTROL

BACKGROUND

The present invention relates generally to gas turbine engines, and in particular to a starting system and method that provides reliable light-off for gas turbine engines.

Gas turbine engines represent a class of engines used to generate kinetic and pneumatic energy. They are employed in a variety of applications, from ground-based power generators to aeronautical applications.

Starting a gas turbine requires the engine to be motored to a certain speed such that the fuel-air mixture provided to the combustor is conducive to light-off (i.e., successful ignition of the engine). The initial kinetic energy is typically provided by a dedicated starter motor or a starter-generator to rotate the APU shaft. Following light-off, the engine is accelerated with the aid of the starter-motor to a self-sustaining speed, at which time the starter motor is disengaged.

Successful light-off depends on the engine speed and flow of fuel delivered to the combustor, which must be coordinated to provide an air/fuel mixture at the igniter capable of sustaining combustion. The range of engine speeds at which starting is most likely to occur is referred to as the "light-off window" and typically ranges from 5% to 20% of the rated engine speed. However, accelerating too quickly through the light-off window typically results in failed ignition. This problem is further complicated if the airflow provided to the compressor and/or combustor is unstable. For example, in aircraft applications in which the auxiliary power unit (APU) is started in-flight, factors such as airspeed of the aircraft and/or wind speed may cause instability in the airflow provided to the combustor. As a result, a particular speed preselected for light-off may not be feasible or successful.

SUMMARY

A starter system provides stepping speed control of a gas turbine engine to provide reliable light-off of the gas turbine engine. During starting, the speed of the gas turbine engine is incremented by stepped amounts through the light-off window from a minimum speed value to a maximum speed value, with the speed of the gas turbine dwelling at each stepped value for a period of time before incrementing the speed of the engine to the next stepped level. If the gas turbine engine is stepped through the entire light-off window without a successful light-off, the controller decreases the target speed of the gas turbine engine to the minimum value and begins the process again. The process continues until successful light-off is initiated or until the light-off window is traversed a certain number of times, after which the start process is aborted.

DETAILED DESCRIPTION

The present invention provides stepping speed control of a gas turbine engine to provide reliable light-off of the gas turbine engine. While applicable to starting methods for any gas turbine engine, the invention is particularly applicable to situations that present the possibility of instability in the airflow provided to the combustor. Instability in airflow alters the speed at which light-off is most predictably achieved. To account for this instability, the present invention employs a starter method that steps the engine through a series of stepped engine speeds, dwelling at each speed for a period of time before incrementing the engine to the next stepped value. Having stepped through the light-off window without successful light-off, the engine speed is stepped back down (allowing another opportunity for light-off) before once again stepping through a series of engine speeds in an attempt to achieve light-off.

Figure 1:
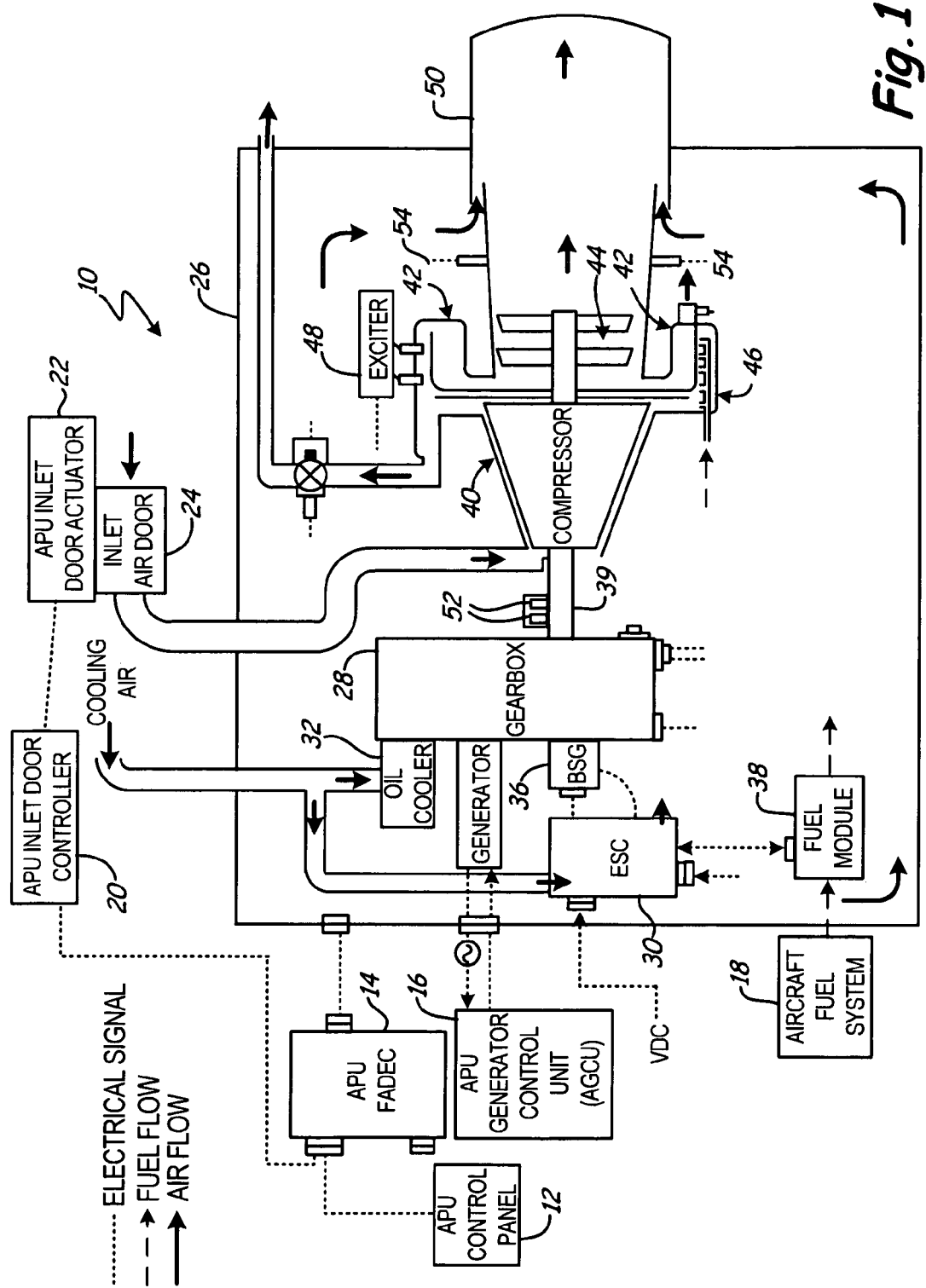
FIG. 1 is a schematic diagram of a gas turbine engine according to the present invention.

FIG. 1 is a schematic diagram showing an auxiliary power unit (APU) system 10, including APU control panel 12, APU full authority digital electronic controller (FADEC) 14, APU generator control unit (AGCU) 16, aircraft fuel system 18, APU inlet air door controller 20, APU inlet air door actuator 22, inlet door 24, and APU 26. As shown in FIG. 1, APU 26 further includes gearbox 28, electric starter controller (ESC) 30, oil cooler 32, generator 34, brushless starter-generator (BSG) 36, fuel module 38, compressor 40, combustor 42, dual-stage turbine 44, fuel manifolds 46, exciter 48, exhaust port 50, speed sensors 52 and temperature sensors 54. Electrical signals are indicated with the use of dashed lines, fuel lines are represented with solid lines, and air flows are shown with shaded solid lines.

APU 26 employs a gas turbine engine that operates on a flow of working medium gas. In particular, ambient air is drawn through inlet air door 24 by compressor 40. Compressor 40 and turbine 44 are rotatably connected to one another by common shaft 39 (along with generator 34 and BSG 36), with combustor 42 interposed between compressor 40 and turbine 44. Ambient air is rammed or drawn in through inlet door 24 and compressed by compressor 40. The compressed air is combined with fuel provided by fuel manifolds 46 to provide a fuel/air mixture to combustor 42. Exciter provides a spark that ignites the fuel/air mixture, and the expansion of the working gas provided by the combustion is converted to mechanical energy by turbines 44. The mechanical energy captured by turbine 44 is communicated by way of shaft 39 to compressor 40, as well as to gearbox 28, which distributes the power to loads such as generator 34. At higher speeds, the mechanical energy provided by turbines 44 results in compressor 40 rotating at a speed that provides the desired fuel/air mixture to combustor 42. In this way, APU 26 is self-sustaining. However, starting APU 26 requires the engine to be motored to a particular speed (or range of speeds) before light-off can be successfully initiated. Even after light-off, the gas turbine requires additional kinetic energy to be supplied by BSG 36 to accelerate the engine to self-sustaining speeds.

As described above, reliable light-off requires a particular fuel/air mixture be provided to combustor 42. This is particularly challenging in applications in which the airflow provided to combustor 42 is unstable, which can be caused as a result of a light-off attempt while APU inlet door 24 is moving. Typically, light-off is not attempted until inlet air door 24 is fully opened to avoid instability in the airflow provided to combustor 42. However, because the present invention is provides reliable starting even in the presence if unstable airflows, the present invention can begin the starting processor before inlet air door 24 is fully opened. This decreases the start time associated with APU 26. In one embodiment, APU inlet air door controller 20 provides an input signal to APU/FADEC 14 indicating that inlet air door 24 is moving towards an open state. In response, APU/FADEC 14 can initiate light-off of the APU according to the method of the present invention while inlet air door 24 is in the process of opening (i.e., not fully opened).

The operation of controllers associated with APU 26 are described in the context of starting-up APU 26. APU control panel 12 provides command signals to APU FADEC 14 dictating the operational state of APU 26. Command signals include 'APU Start', 'APU Stop', and 'Emergency Stop'. Start-up of APU 26 is initiated in response to an 'APU Start' command signal received from APU control panel 12. In response, APU FADEC 14 provides control commands to APU inlet air door controller 20, which controls the opening/closing (by way of APU inlet air door actuator 22) of inlet air door 24. APU FADEC 14 also provides command signals to ESC 30, including fuel commands, fuel solenoid valve commands, starter speed commands, starter enable commands, and tapped commands. In response, ESC 30 communicates with BSG 36 to accelerate the gas turbine to a speed appropriate for light-off. As discussed in more detail below, the method of starting APU 26 does not rely on a particular speed, but rather relies on the stepped increases of engine speed through the light-off window to achieve reliable light-off despite unstable airflows. BSG 36 acts as a motor to rotate shaft 39 (and components connected to rotate with shaft 39) at a speed defined by control signals provided by ESC 30. The engine speed dictates, at least in part, the airflow drawn through inlet air door 24 by compressor 40 and provided to combustor 42. Likewise, fuel module 38 provides fuel by way of fuel manifolds 46 to combustor 42. Proper selection of the engine speed and flow of fuel results in a fuel/air mixture that is advantageous for successful light-off.

Successful light-off is detected by APU/FADEC 14 via temperature sensors 54. Successful light-off results in an increase in the air temperature associated with the exhaust, which is detected by temperature sensors 54. Following light-off, APU/FADEC 14 commands ESC 30 to accelerate the engine to a self-sustaining speed. Having reached a self-sustaining speed, BSG 36 is disengaged. The kinetic energy generated by APU 26 is converted to electrical energy by generator 34, which is provided as three-phase alternating current power to AGCU 16, typically after the APU has been accelerated to 100% of the desired speed level.

The present invention is applicable to all types of gas turbine engines, but is particularly relevant to APUs (such as the APU described with respect to FIG. 1) employed in aircraft applications. In particular, the present invention provides reliable in-flight starting of the gas turbine engine associated with the APU (i.e., starting the gas turbine while the aircraft is moving). As described in more detail with respect to FIG. 2, APU FADEC 14 controls the speed of the engine through the light-off window in a stepped manner, coupled with dwell periods at each speed to allow time for the air/fuel mixture provided at each stepped speed a chance to initiate light-off. If the engine is motored through the entire light-off window without initiating light-off, APU/FADEC 14 steps down the engine speed to a minimum value before reinitiating stepped increases through the light-off window. At any time during the process (including during the deceleration period), if light-off is detected the start-up process continues to the next stage, in which the engine is accelerated to a self-sustaining speed before BSG 36 is disengaged.

Figure 2:
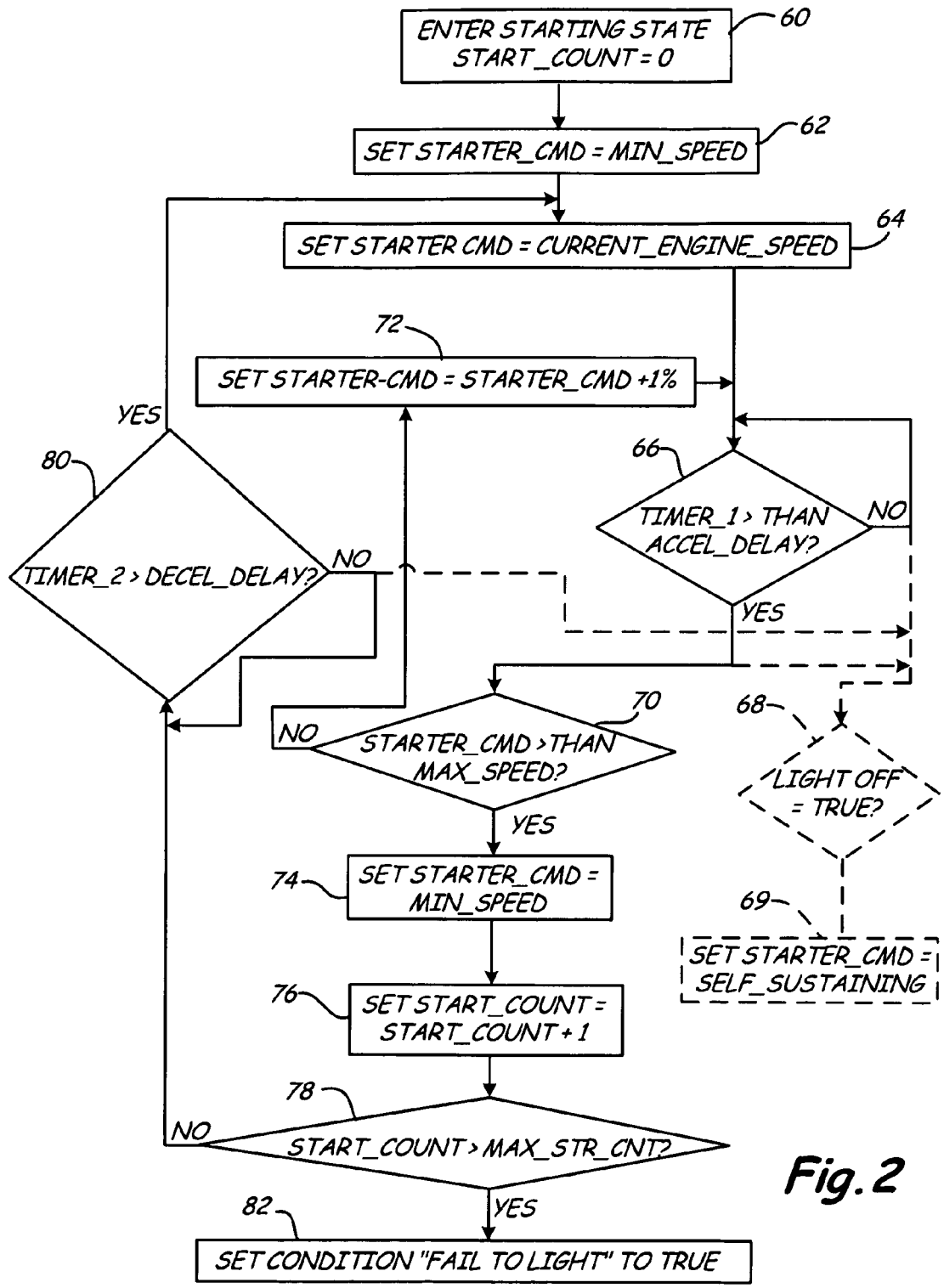
FIG. 2 is a flowchart illustrating steps employed for reliable light-off of a gas turbine engine according to the present invention.

FIG. 2 is a flowchart illustrating steps for in-flight light-off of the APU according to the present invention. The flowchart begins with a start sequence being initiated for the gas turbine engine, and ends either with the successful light-off of the gas turbine or with a decision to abort the start sequence. These steps indicate actions and decisions made by APU/FADEC 14 (as shown in FIG. 1). APU/FADEC 14 maintains as part of the start-up process a number of variables, including a start counter (labeled 'start_count'), minimum speed (labeled 'min_speed'), maximum speed (labeled 'max_speed'), dwell times (labeled 'accel_delay'), and deceleration delay (labeled 'decel_delay'). APU/FADEC 14 also makes use of one or more timers (labeled here as 'timer_1' and 'timer_2') and several constants, such as a maximum start count (labeled 'max_start_count'). APU/FADEC 14 provides an output to ESC 30 (as shown in FIG. 1) a starter command value (labeled 'starter_cmd') that dictates the engine speed provided by BSG 36.

At step 60, APU/FADEC 14 resets the start counter 'start_count' to zero, indicating that this is the first attempt to light-off the engine.

At step 62, APU/FADEC 14 sets the starter command value 'starter_cmd' equal to the minimum speed 'min_speed' associated with the light-off window. The minimum speed value selected by APU/FADEC 14 varies depending on the application, typically based on design aspects associated with the APU. The starter command value 'starter_cmd' is provided as an input to ESC 30, which accelerates the engine to the desired speed.

At step 64, APU/FADEC 14 sets the starter command value 'starter_cmd' equal to the current engine speed (labeled 'engine_speed') as monitored by speed sensors 52 (as shown in FIG. 1). In this way, any difference between the starter command value, representing the desired engine speed, and the actual engine speed is resolved. If the starter command value was not set equal to the actual engine speed, then the first stepped increase of the starter command value may inadvertently result in a large stepped increase of the actual engine speed. Having reached the first step in the acceleration through the light-off window, APU/FADEC 14 initiates light-off attempts. These attempts continue throughout the remainder of the described process. The illustration also indicates periodic monitoring to determine if light-off has been successful. In actuality, APU 26 would be continually monitored, based on feedback provided by temperature sensors 54, to determine whether light-off has been successfully initiated.

At step 66, APU/FADEC 14 causes the engine to dwell at the speed determined by the start command for a period of time (labeled here as 'accel_delay'). The dwell time imposed by APU/FADEC 14 is implemented with a timer (labeled her as 'timer_1') that is continuously compared with the defined variable 'accel_delay'. The variable 'accel_delay' may be selected by APU/FADEC 14 based on current start conditions. For example, the 'accel_delay' variable may be increased for cold ambient temperatures, in which slower acceleration (due to colder batteries) and slower atomization of the fuel/air mixture provided to the combustor may increase the time required to initiate light-off at a particular speed. In contrast, the 'accel_delay' variable may be decreased in warm ambient conditions for precisely the opposite reasons. Other factors such as altitude, humidity, and aircraft speed may also be accounted for by APU/FADEC 14 in selecting the 'accel_delay' value. Assuming the timer has not exceeded the defined constant, the loop continues wherein the engine speed is maintained at the speed defined by the speed command.

In addition, APU/FADEC 14 continually monitors the gas turbine engine at step 68 via temperature sensors 54 to determine whether light-off has been successful. The dashed lines used to illustrate steps 68 and 69 indicate that these steps may be performed in the background, contemporaneous with the other steps employed to step the engine through the light-off window. If APU/FADEC 14 determines that light-off has been successfully initiated, then APU/FADEC 14 exits the start sequence shown in FIG. 2, and sets the speed command 'speed_cmd' to a self-sustaining speed value (not shown), which is typically greater than any speeds associated with the light-off window. Additional steps (not shown here) are required to ensure that light-off has been successful (i.e., the gas turbine is self-sustaining), at which time APU/FADEC 14 causes BSG 36 to be disengaged from the gas turbine. APU/FADEC 14 continually monitors the state of the gas turbine engine to determine whether light-off has been successful. Assuming light-off is not successfully detected, then stepped control of the engine through the light-off window proceeds are described in FIG. 2.

If the timer 'timer_1' has exceeded the dwell time 'accel_delay', then at step 70, the starter command value is compared to maximum starter speed value 'max_speed'. The maximum starter speed represents a maximum speed associated with the light-off window Like the minimum speed value, the maximum speed value selected by APU/FADEC 14 varies depending on the application, typically based on design aspects associated with the APU.

If the starter command value 'starter_cmd' has not exceeded the maximum speed value 'max_speed', then at step 72 controller 16 increases the starter command by a defined amount, resulting in a stepped increase in the speed of the gas turbine. In the embodiment shown in FIG. 2, the starter command is increased by 1% as compared with the previous starter command value. In other embodiments, the stepped increase may be defined by a constant or may be a variable amount selected by APU/FADEC 14, which may vary depending on factors sensed by APU/FADEC 14 or may vary according to a pre-selected program. After increasing the speed command (resulting in a corresponding increase in engine speed), at step 66 APU/FADEC 14 causes the engine to dwell at the newly selected speed command for a period of time. In the embodiment shown in FIG. 2, this subsequent dwell period is equal in time to the initial dwell period, although in other embodiments the dwell time may be varied depending on factors sensed by APU/FADEC 14 or based on scheduled dwell times at each step. Once again, APU/FADEC 14 continually monitors the gas turbine to determine whether light-off has been successfully initiated.

If the starter command value 'starter_cmd' has exceeded the maximum speed value 'max_speed', meaning that the gas turbine engine has reached the maximum speed within the light-off window, then at step 74 the starter command 'start_cmd' is stepped down to the minimum speed value 'min_speed' (as defined previously with respect to step 44). In this way, having stepped the speed of the gas turbine through the light-off window, the speed of the gas turbine is now decelerated back to the minimum speed defined by the light-off window and the process of stepping the engine speed through the light-off window is repeated. However, if APU/FADEC 14 has already stepped the gas turbine through the light-off window a certain number of times, as defined by start counter 'start_count' incremented at step 76 and compared to a threshold (labeled 'max_start_count') at step 78, then the start process is aborted at step 82.

If at step 78, the start counter 'start_count' is less than the threshold, then the gas turbine is decelerated to the minimum value. In this embodiment, BSG 36 does not employ braking mechanisms as they would increase the weight and cost of the system. As a result, deceleration of the engine is provided by reducing the speed command to the minimum value and introducing a delay, defined by the value of the variable 'decel_delay', to allow the engine time to decelerate. The length of the delay introduced is based on factors such as the difference between the minimum speed 'min_speed' and the maximum speed 'max_speed'.

During the deceleration delay provided at step 80, APU/FADEC 14 continues to monitor the gas turbine for successful light-off. If light-off is detected, then APU/FADEC 14 ends the deceleration delay and begins accelerating the gas turbine to a self-sustaining speed as described above.

Following the deceleration delay provided at step 80 (and assuming no successful light-off during the deceleration delay) then the process is repeated at step 64 with APU/FADEC 14 setting the speed command value 'speed_cmd' to the current speed of the engine as monitored by speed sensors 52. As described above, this accounts for any difference between the starter command value, representing the desired engine speed, and the actual engine speed. The process repeats until either successful light-off is initiated or the number of attempts exceeds a threshold value, at which time the start-up process is aborted at step 80.

While this invention has been described and is applicable to all types of gas turbine engines, the invention is particularly applicable to gas turbine engines employed as part of APUs that require in-flight starting. The challenges associated with in-flight light-off of an APU, which is affected by factors including altitude, temperature, aircraft speed, and airflow through the APU, are overcome by stepping the gas turbine through a plurality of different engine speeds, and allowing the engine to dwell at each speed for a period of time. In this way, the engine is not simply motored through the light-off window, without regard to which speed is actually most conducive to light-off, but is stepped through a plurality of speeds to provide a high likelihood of successful light-off.

Although the present invention has been described with reference to preferred embodiments, workers skilled in the art will recognize that changes may be made in form and detail without departing from the spirit and scope of the invention.

The invention claimed is:

1. A system for starting a gas turbine engine, the system including:
   a starter-motor connected to rotate the gas turbine engine at a speed defined by a speed command value; and
   a controller for generating speed command values provided to the starter-motor to control the speed of the gas turbine engine, the controller providing speed command values that result in stepped increases in the speed of the gas turbine engine through a light-off window from a minimum speed value to a maximum speed value, with the speed of the gas turbine dwelling at each stepped speed command value for a period of time before the controller increments the speed command value to the next stepped level, wherein if the gas turbine engine is stepped through the entire light-off window without success, the controller decreases the speed of the gas turbine engine to the minimum speed value and repeats the stepped traversal of the light-off window.

2. The system of claim 1, wherein the controller provides a deceleration delay following each traversal of the light-off window to allow the gas turbine engine to decelerate to the minimum speed value before initiating repeating the stepped traversal of the light-off window.

3. The system of claim 2, wherein light-off of the gas turbine engine is continually attempted at each stage of the start-up process, including during the stepped increases in speed of the gas turbine engine and during the deceleration delay associated with the gas turbine engine following an unsuccessful traversal of the light-off window.

4. The system of claim 1, wherein the controller selects an amount of time to dwell at each stepped speed interval based on one or more factors, including but not limited to ambient temperature, altitude, aircraft speed, and/or humidity.

5. The system of claim 1, wherein increments to the speed command value are selected from a group consisting of percentage increments over a current speed command value, constant increment over a current speed command value, variable increment based on factors sensed by the controller, and variable, pre-programmed increment values.

6. The system of claim 1, wherein the controller provides speed command values that result in stepped increases in the speed of the gas turbine engine through the light-off window while an air inlet door is moving from a closed state to an opened state.

7. A method of starting a gas turbine engine, the method comprising:
   (a) incrementing a speed command value of the gas turbine engine by stepped amounts through a light-off window from a minimum speed value to a maximum speed value;
   (b) dwelling for a period of time at each stepped speed command value before incrementing the speed command value;
   (c) decreasing the speed command value of the gas turbine engine to the minimum speed value following traversal of the light-off window without successful light-off; and
   repeating steps (a) through (c) until light-off of the gas turbine engine is successful or the light-off window is traversed a number of times without successful light-off.

8. The method of claim 7, wherein incrementing the speed of the gas turbine engine includes:
   incrementing the speed command value based on one of the following methods, a percentage-based increment of the speed command value, a constant value increment of the speed command value, a variable value increment based on factors sensed by the controller, and a variable value increment based on pre-programmed values.

9. The method of claim 7, wherein dwelling for a period of time at each stepped speed command value before incrementing the speed command value includes:
   maintaining a first timer indicating time spent at the selected speed command value; and
   comparing the first timer to an acceleration-delay value, wherein when the first timer exceeds the acceleration-delay value the speed command value is incremented at step (a) or decreased to the minimum speed value if the light-off window has been traversed at step (c).

10. The method of claim 9, further including
   selecting the acceleration delay value based on one or more sensed conditions, including but not limited to ambient temperature, altitude, aircraft speed and/or humidity.

11. The method of claim 7, wherein decreasing the speed command value of the gas turbine engine to the minimum speed value following traversal of the light-off window without successful light-off further includes:
   introducing a deceleration delay to allow the gas turbine engine to decelerate to the minimum speed command value.

12. The method of claim 10, wherein introducing the deceleration delay includes:
   maintaining a second timer indicating time spent decelerating; and
   comparing the second timer to a deceleration-delay value, wherein when the second timer exceeds the deceleration-delay value the gas turbine engine dwells at the minimum speed at step (b).

13. The method of claim 12, wherein the deceleration-delay value is selected based on a difference between the maximum speed value and the minimum speed value.

14. The method of claim 7, further including:
   performing steps (a) through (c) contemporaneous with opening of an inlet air door.

15. A gas turbine engine starter system that supports starting and light-off of a gas turbine engine, the starter system comprising:
   a first input connected to receive signals provided by one or more temperature sensors monitoring exhaust temperature of the gas turbine engine;
   an output connected to provide a speed command signal to a starter-generator that dictates an engine speed during starting; and
   a controller connected to the first input and the output, the controller maintaining a minimum speed command value, a maximum speed command value, and a counter, wherein the controller generates speed command values during start-up provided at the output to control the speed of the gas turbine engine during start-up based on the following algorithm implemented by the controller, the algorithm comprising:
   (a) setting the speed command value equal to the minimum speed command value, the minimum speed command value representing a minimum speed associated with the light-off window;
   (b) maintaining the speed command value at the selected speed for a dwell time, during which time light-off of the engine is attempted;
   (c) continually monitoring the temperature signals provided at the first input to determine whether light-off has been successful, wherein if light-off is successful at any stage then proceeding to step (j);
   (d) following unsuccessful light-off during the dwell time, comparing the speed command value to the maximum speed value representing a maximum speed associated with the light-off window, wherein if the speed command value exceeds the threshold value then proceed to step (g);
   (e) incrementing the speed command value;
   (f) repeating steps (b) through (e);
   (g) incrementing the counter, wherein the counter represents a number of traversals through the light-off window;
   (h) comparing the first counter to a threshold value, wherein if the counter exceeds the threshold value then starting of the gas turbine engine start is aborted;
   (i) repeating steps (a) through (h); and
   (j) setting the speed command value to a self-sustaining speed value to accelerate the gas turbine engine to a self-sustaining speed if light-off is successful, at which time the starter motor is disengaged.

16. The system of claim 15, wherein the controller further maintains an acceleration-delay value and a first timer, wherein the step of maintaining the speed command value at the selected value for the dwell time further includes:
   maintaining the first timer indicating time spent at the selected speed command value;
   comparing the first timer to the acceleration-delay value; and
   proceeding to step (d) when the first timer exceeds the acceleration delay value.

17. The system of claim 16, wherein the step of maintaining the speed command value further includes:

selecting the acceleration delay value based on one or more sensed conditions, including but not limited to ambient temperature, altitude, aircraft speed, and/or humidity.

18. The system of claim 15, wherein the controller further maintains a deceleration delay value and a second timer, wherein following the step of setting the speed command value to the minimum speed after unsuccessfully traversing the light-off window, the method further includes:
    maintaining the second timer indicating time spent decelerating; and
    comparing the second timer to the deceleration-delay value and proceeding to step (b) when the second timer exceeds the deceleration-delay value.

19. The system of claim 18, wherein the deceleration-delay value is selected based on a difference between the maximum speed value and the minimum speed value.

20. The system of claim 15, wherein the step of incrementing the speed command value includes:
    incrementing the speed command value based on one of the following methods, a percentage-based increment of the speed command value, a constant value increment of the speed command value, a variable value increment based on factors sensed by the controller, and a variable value increment based on pre-programmed values.

21. The system of claim 15, further including:
    a second input connected to receive signals provided by an inlet air door controller that is responsible for opening an inlet air door, wherein the controller is further connected to the second input and initiates start-up in response to notification from the inlet air door controller that the inlet air door is opening.

* * * * *